(12) United States Patent
Abdelnour et al.

(10) Patent No.: US 10,300,843 B2
(45) Date of Patent: May 28, 2019

(54) VEHICLE ILLUMINATION ASSEMBLY

(71) Applicant: Ford Global Technologies, LLC, Dearborn, MI (US)

(72) Inventors: Sleiman N. Abdelnour, Macomb, MI (US); Paul Kenneth Dellock, Northville, MI (US); Stuart C. Salter, White Lake, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/993,637

(22) Filed: Jan. 12, 2016

(65) Prior Publication Data
US 2017/0197543 A1    Jul. 13, 2017

(51) Int. Cl.
| | |
|---|---|
| F21V 11/00 | (2015.01) |
| B60Q 1/32 | (2006.01) |
| B60Q 1/26 | (2006.01) |
| F21K 2/00 | (2006.01) |
| F21V 3/04 | (2018.01) |
| F21S 43/145 | (2018.01) |
| F21S 43/235 | (2018.01) |
| F21V 9/30 | (2018.01) |
| F21Y 115/10 | (2016.01) |

(52) U.S. Cl.
CPC ............ *B60Q 1/32* (2013.01); *B60Q 1/2626* (2013.01); *F21K 2/00* (2013.01); *F21S 43/145* (2018.01); *F21S 43/235* (2018.01); *F21V 3/049* (2013.01); *F21V 9/30* (2018.02); *F21Y 2115/10* (2016.08)

(58) Field of Classification Search
CPC ... B60Q 3/68; B60Q 3/78; B60Q 3/14; B60Q 1/32; B60Q 1/323; B60Q 3/62; B60Q 3/64; B60Q 3/66; G02B 6/0028; G02B 6/0088
USPC .............................................. 362/277, 84, 80
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

Phosphor Handbook, Shigeo Shionoya and William Yen, 1998, pp. 656, included capture of pertinent page.*

*Primary Examiner* — Matthew J. Peerce
(74) *Attorney, Agent, or Firm* — Vichit Chea; Price Heneveld LLP

(57) ABSTRACT

A vehicle side marker is provided herein. The side marker may include a translucent lens having a texture thereon. A substrate may be attached to the lens. A first photoluminescent structure and a second photoluminescent structure are disposed between an exterior surface of the lens and the substrate. The first and second photoluminescent structures are configured to luminesce in response to excitation by a light source. The first photoluminescent structure may include a long persistent photoluminescent material therein.

14 Claims, 9 Drawing Sheets

(56) References Cited

U.S. PATENT DOCUMENTS

| | | | |
|---|---|---|---|
| 5,839,718 A | 11/1998 | Hase et al. | |
| 6,031,511 A | 2/2000 | DeLuca et al. | |
| 6,117,362 A | 9/2000 | Yen et al. | |
| 6,294,990 B1 | 9/2001 | Knoll et al. | |
| 6,364,498 B1 | 4/2002 | Burbank | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,617,781 B2 | 9/2003 | Murazaki et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,556,404 B2 * | 7/2009 | Nawashiro | F21V 5/04 257/98 |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 * | 2/2015 | Kingsley | C09K 11/7734 250/458.1 |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2005/0190570 A1 | 9/2005 | Roessler | |
| 2005/0199175 A1 | 9/2005 | Aamotsbakken et al. | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 * | 12/2013 | Mulder | F21V 9/00 362/555 |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0253179 A1 | 9/2017 | Kumada | |

FOREIGN PATENT DOCUMENTS

| | | |
|---|---|---|
| CN | 201193011 Y | 2/2009 |
| CN | 201696873 U | 1/2011 |
| CN | 202169904 U | 3/2012 |

(56) References Cited

FOREIGN PATENT DOCUMENTS

| | | |
|---|---|---|
| CN | 202944278 U | 5/2013 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 2778209 A1 | 9/2014 |
| JP | 2000159011 A | 6/2000 |
| JP | 2007238063 A | 9/2007 |
| JP | 2013241169 A | 12/2013 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE ILLUMINATION ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle side marker is disclosed. The vehicle side marker includes a translucent lens having a texture thereon. A substrate is attached to the lens. A first photoluminescent structure and a second photoluminescent structure are disposed between an exterior surface of the lens and the substrate. The first and second photoluminescent structures are configured to luminesce in response to receiving an excitation light emitted by a light source.

According to another aspect of the present invention, a vehicle illumination assembly is disclosed. The vehicle illumination assembly includes a lens. A substrate is coupled to the lens. A first photoluminescent structure is disposed between the lens and substrate and is configured to luminesce in response to excitation light.

According to yet another aspect of the present invention, a vehicle is disclosed. The vehicle includes a plurality of body panels defining the exterior of a vehicle. An illumination assembly is disposed on one of the plurality of body panels. The illumination assembly includes a long persistent photoluminescent material that is configured to emit converted light for more than two hours in response to receiving an excitation light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
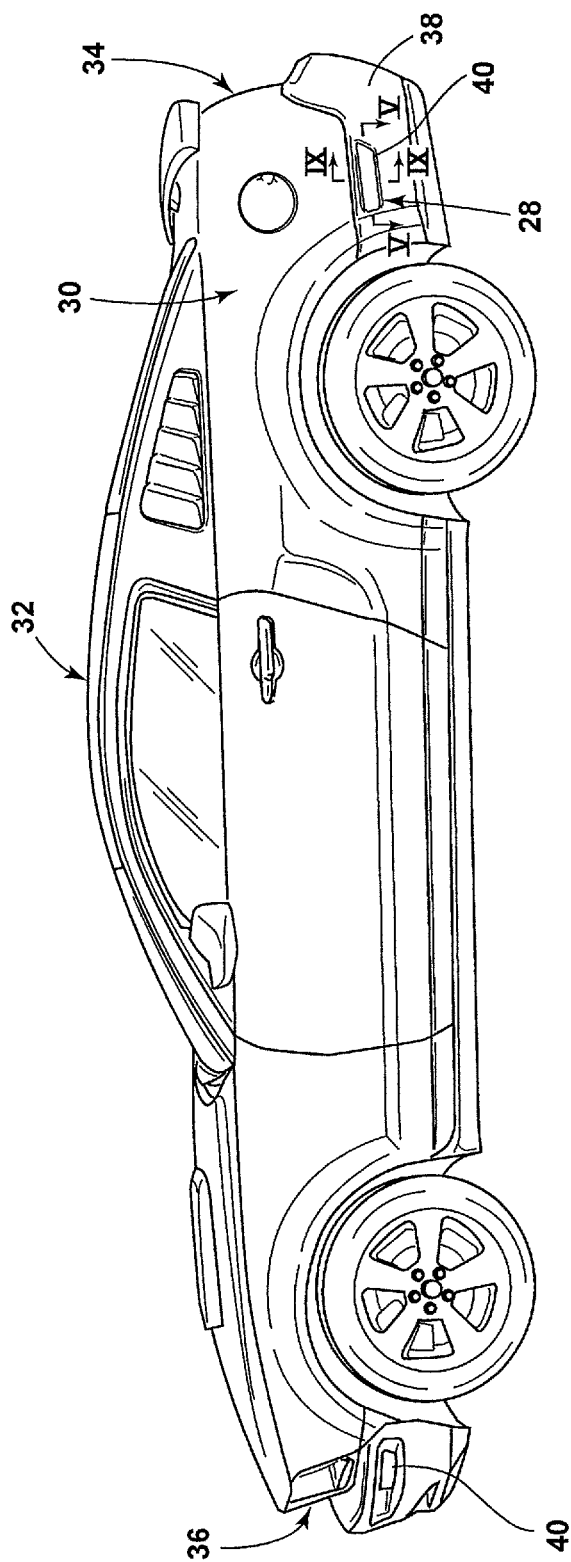
FIG. 2 is a perspective side view of a vehicle equipped with an illumination assembly configured as a side marker, according to one embodiment.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a vehicle. The illumination assembly may advantageously employ one or more photoluminescent structures that illuminate in response to pre-defined events. The one or more photoluminescent structures may be configured to receive an excitation light and re-emit a converted light at a different wavelength typically found in the visible wavelength spectrum. The converted light may be emitted from the photoluminescent structure for a substantial amount of time once the excitation light is removed.

Figure 1A:
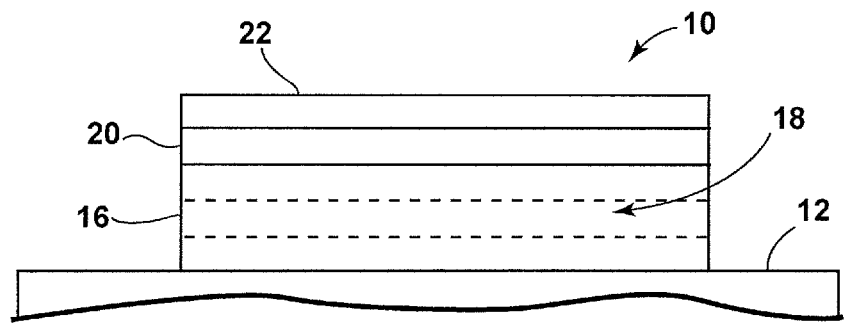
FIG. 1A is a side view of a photoluminescent structure rendered as a coating for use in a trim assembly according to one embodiment.
Figure 1B:
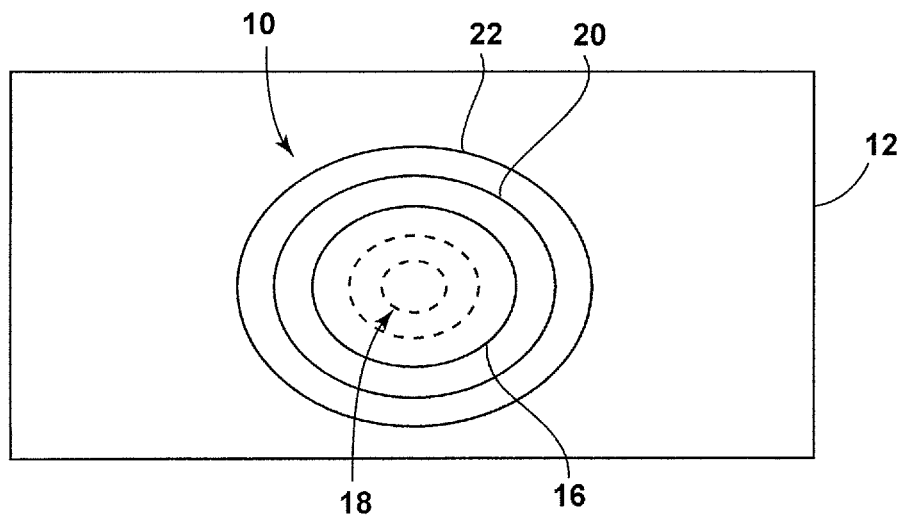
FIG. 1B is a top view of a photoluminescent structure rendered as a discrete particle according to one embodiment.
Figure 1C:
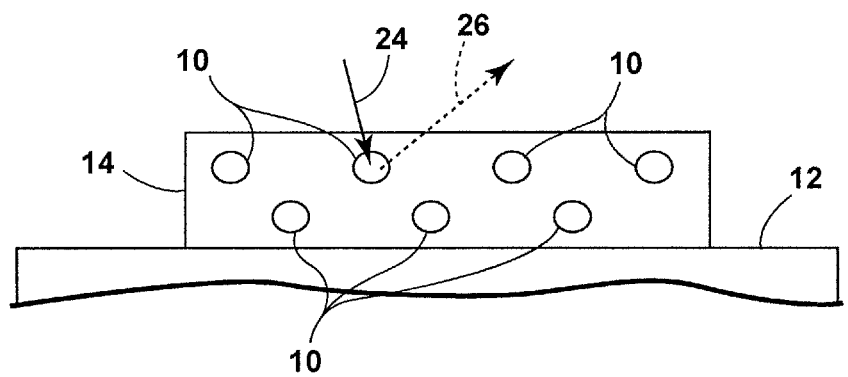
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength light that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 68 is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

In some embodiments, the converted light 26 that has been down converted or up converted may be used to excite other photoluminescent material(s) 18 found in the energy conversion layer 16. The process of using converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES,"

filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The photoluminescent material 18, according to one embodiment, disposed within the photoluminescent structure 10 may include a long persistent phosphorescent material that emits converted light 26, once charged by the excitation light 24. The excitation light 24 may be emitted from any light source (e.g., any natural light source, such as the sun, and/or artificial light source). The long persistent phosphorescent material may be defined as being able to store an excitation light 24 and release converted light 26 gradually, for a period of several minutes or hours, once the excitation light 24 is no longer present. The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The long persistent phosphorescent material, according to one embodiment, may be operable to emit light at or above an intensity of 0.32 mcd/m$^2$ after a period of 10 minutes. Additionally, the long persistent phosphorescent material may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistent phosphorescent material may continually illuminate in response to excitation from a plurality of excitation sources that emit an excitation light 24, including, but not limited to, natural light source (e.g., the sun) and/or any artificial light source 68. The periodic absorption of the excitation light 24 from any excitation source may provide for a substantially sustained charge of the long persistent phosphorescent material to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistent phosphorescent material may correspond to alkaline earth aluminates and silicates, for example doped di-silicates, or any other compound that is capable of emitting light for a period of time once an excitation light 24 is no longer present. The long persistent photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from an excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long long persistent phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistent phosphor known in the art may also be utilized without departing from the teachings provided herein.

Additional information regarding the production of long persistent photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENT BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Referring to FIG. 2, an illumination assembly 28 is generally shown mounted on a side body panel 30 of a vehicle 32. In other embodiments, the illumination assembly 28 may be located elsewhere, such as, but not limited to, other locations of the side panel(s) 30, the rear portion 34, or the front portion 36 of the vehicle 32. Alternatively, the illumination assembly 28 may be disposed inside the vehicle 32. In the presently illustrated embodiment, the illumination assembly 28 is disposed within a rear bumper 38, thus allowing the illumination assembly 28 to be readily viewed by an observer looking at the side portion 30 of the vehicle 32.

The illumination assembly 28 may be configured as a side marker 40 that notifies other drivers as to the location and size of the vehicle 32 during both daytime and nighttime driving. Side markers 40 are generally mounted on the sides of a motor vehicle 32 to indicate to other drivers the presence and/or overall length of the vehicle 32. Additionally, or alternatively, the illumination assembly 28 may be configured as a clearance marker that is generally mounted on the front and rear of vehicles 32 to indicate to other drivers the presence and/or overall width of a vehicle 32. It will be appreciated that the illumination assembly 28 provided herein may be disposed on any location on and/or within the vehicle 32 without departing from the teachings provided herein.

According to one embodiment, the illumination assembly 28 may be configured to luminesce in response to receiving the excitation light 24. The luminescence exhibited by the illumination assembly 28 may provide one or more distinct lighting functions. The illumination may offer a unique, substantially uniform, and/or attractive viewing experience that may be difficult to duplicate through non-photoluminescent means. It will also be appreciated that the illumination assembly 28 described herein may be utilized for any vehicle 32 such as, but not limited to, coupes, sedans, trucks, sport utility, vans, and the like. Further, it will be appreciated that any lighting system found elsewhere on the vehicle 32 may also be manufactured in accordance with the principles of the present disclosure.

Figure 3:
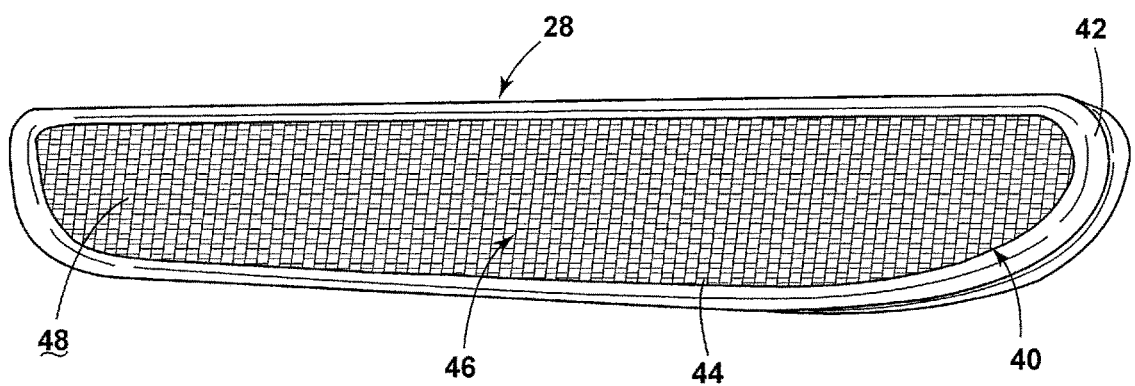
FIG. 3 is a front-side perspective view of the illumination assembly, according to one embodiment.

Referring to FIG. 3, the illumination assembly 28 is exemplarily shown, according to one embodiment, having a substrate 42 and a lens 44 that includes the viewable portion 46. A cavity 48 may be disposed between the lens 44 and the substrate 42. The cavity 48 may be hollow, may include additional components therein, and/or may be wholly filled in when the lens 44 and substrate 42 are attached to one another. Each portion of the substrate 42 and the lens 44 may be made of any practicable material, including, but not limited to, a polymeric material, an elastomeric material, a glass material, and/or a combination thereof.

The lens 44 may be formed from a transparent or translucent material that may be colored any desired color (e.g., red, amber, etc.). The lens 44 may also be provided with a textured, or non-planar, surface that may diffuse or focus light through etching, molding, forming, or any other process known in the art.

Figure 4:
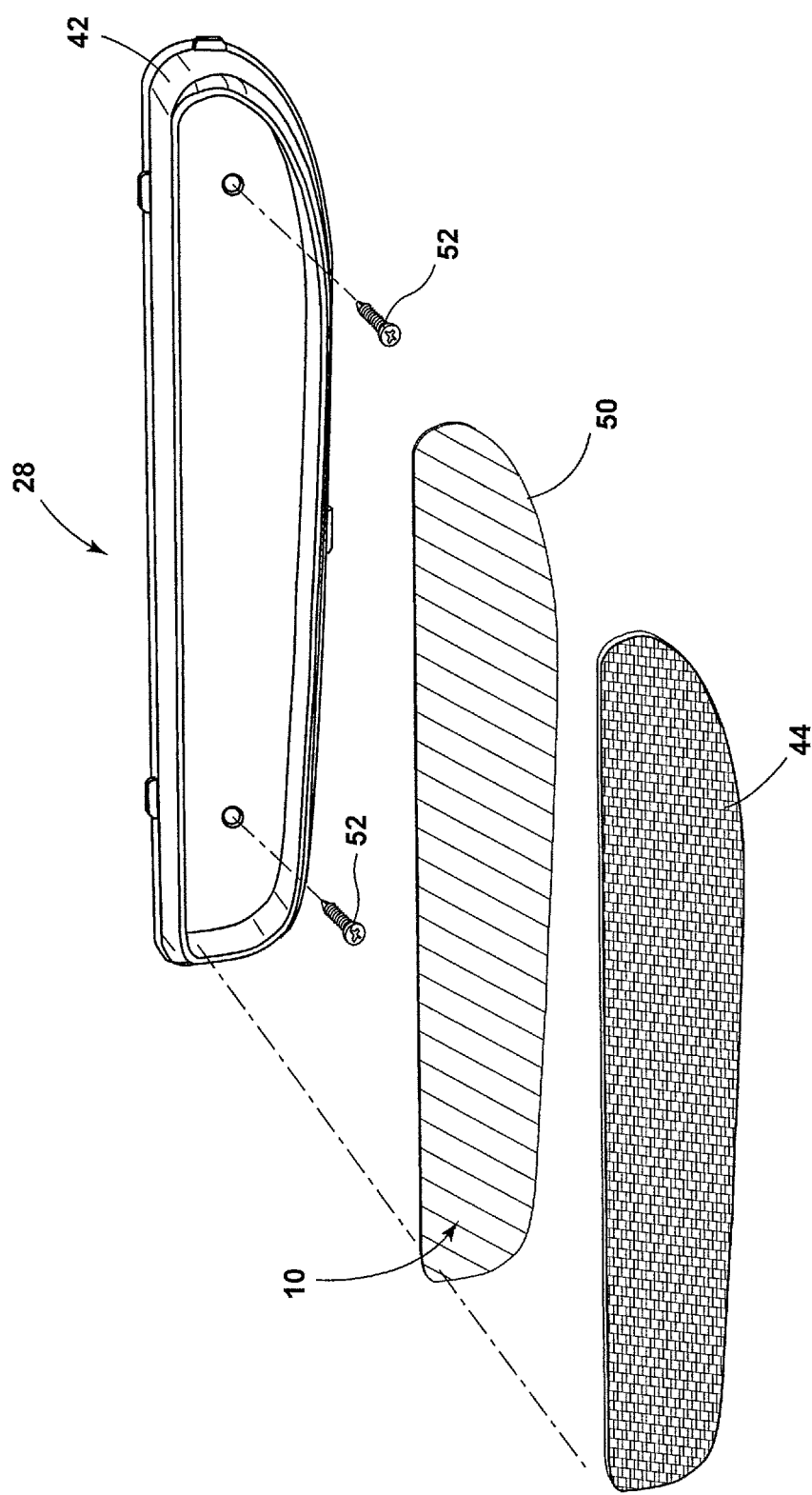
FIG. 4 is an exploded view of the illumination assembly, according to one embodiment.

Referring to FIG. 4, the illumination assembly 28 includes the substrate 42 which may secure the illumination assembly 28 to the vehicle 32, a lens 44, and an elongated member 50 therebetween. The illumination assembly 28 may be secured or otherwise attached to the vehicle 32 by fasteners 52, including, but not limited to, screws, bolts, rivets, or any other such fastener. Alternatively, adhesives may be utilized for attaching the illumination assembly 28 to the vehicle 32. Alternatively still, the illumination assembly 28 may be integrally formed with a component of the vehicle 32, such as the bumper 38.

The lens 44 may be arranged such that it is reversibly attached to the substrate 42. For example, the lens 44 and the substrate 42 may include attachment features, such as tabs and notches or ridges and grooves. Such attachment features may allow the lens 44 to be selectively snapped onto the substrate 42 (i.e., attached to the substrate 42) and selectively snapped off of the substrate 42 (i.e., removed from the substrate 42).

The elongated member 50 may be formed from any suitable material and may have the photoluminescent structure 10 disposed thereon and/or within the elongated member 50. According to one embodiment, the elongated member 50 is configured as a polyester film or plastic sheet that extends the length on the interior surface of the lens 44. According to an alternate embodiment, the elongated member 50 may be formed from a reflective foil. The photoluminescent structure 10, which may contain a long persistent phosphorescent material, may be disposed on the elongated member 50. The photoluminescent structure 10 may receive excitation light 24 at a first wavelength and emit converted light 26 at a second wavelength. When the photoluminescent structure 10 is not emitting light, the photoluminescent structure 10 may be reflective such that light at a non-excitation wavelength may penetrate the lens 44 and be redirected back through the lens 44.

Figure 5:
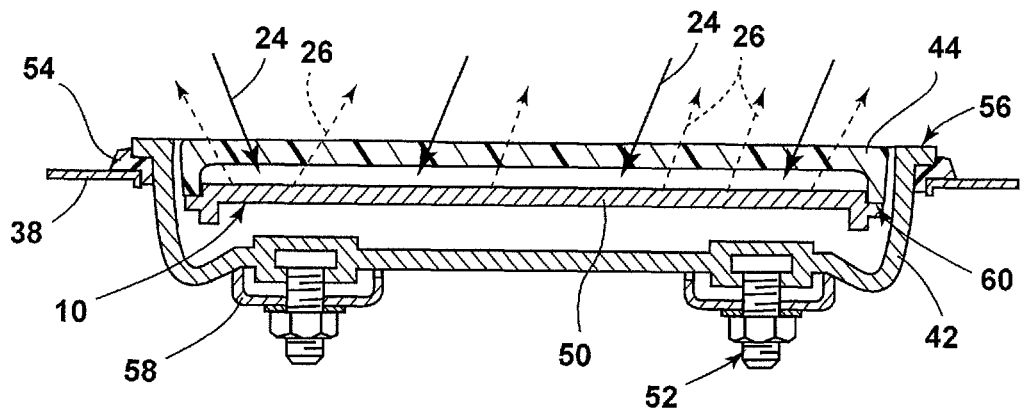
FIG. 5 is a cross-sectional view taken along the line V-V of FIG. 2 illustrating one embodiment of the illumination assembly having an elongated member disposed between a lens and a substrate.

Referring to FIG. 5, a cross section taken along the line V-V of FIG. 2 illustrates the illumination assembly 28 having the substrate 42, the lens 44, the elongated member 50, and a seal 54. The substrate 42 may be installed in a recessed fashion in the bumper 38, but, in alternate embodiments, the substrate 42 may be attached to any other panel 30 of the vehicle 32. The substrate 42 may include a peripheral flange 56 disposed on the outer side of the body panel 30. The circumferential seal 54 may be disposed between the flange 56 and the bumper 38 to prevent environmental debris from entering the space therebetween.

The illumination assembly 28 may be attached to the vehicle 32 through the use of any fastener 52, or adhesive, such as screws anchored into the body panel 30, body of the vehicle 32, or any other structure of the vehicle 32. Clamping brackets 58 may be utilized to secure the illumination assembly 28 to the vehicle 32. The bracket 58 may be used independently, or in conjunction with the fastener 52. The illumination assembly 28 may be attached to the vehicle 32 such that outputted light emitted therefrom is directed in any desired direction. According to one embodiment, light may be directed away from the vehicle 32 and on a slight downward angle such that the outputted light does not distract drivers of adjacently disposed vehicles.

With further reference to FIG. 5, the elongated member 50 may have the photoluminescent structure 10 therein, or thereon, at any location between the lens 44 and the substrate 42. The elongated member 50 may be attached by any means known in the art. For example, a peripheral portion 60 of the elongated member 50 may be attached to the lens 44 through vibration welding, or an adhesive. It will be appreciated that the elongated member 50 may be attached by any means without departing from the teachings provided herein.

In operation, the photoluminescent material 18 is formulated to become excited upon receiving excitation light 24 of a specific wavelength from any excitation source, such as the sun or any artificial light source 68. As a result, the excitation light 24 undergoes an energy conversion process and is re-emitted at a different wavelength as converted light 26. According to one embodiment, the photoluminescent material 18 may be formulated to convert excitation light 24 into a longer wavelength light, otherwise known as down conversion. Alternatively, the photoluminescent material 18 may be formulated to convert excitation light 24 into a shorter wavelength light, otherwise known as up conversion. Under either approach, light converted by the photoluminescent material 18 may be immediately outputted from the photoluminescent structure 10 or otherwise used in an energy cascade, wherein the converted light 26 serves as excitation light 24 to excite another formulation of photoluminescent material 18 located within the energy conversion layer 16, whereby the subsequent converted light 26 may then be outputted from the photoluminescent structure 10 or used as excitation light 24, and so on. With respect to the energy conversion processes described herein, the difference in wavelength between the excitation light 24 and the converted light 26 is known as the Stokes shift and serves as the principle driving mechanism for an energy conversion process corresponding to a change in wavelength of light.

In one embodiment, the energy conversion process is undertaken by way of down conversion, whereby the excitation light 24 includes light on the lower end of the visible spectrum such as blue, violet, or ultraviolet (UV) light. Doing so enables natural light, such as sun light, to be used as the excitation source.

Still referring to FIG. 5, the lens 44 and the elongated member 50 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create the lens 44, which may be integrally formed with the elongated member 50. Initially, the lens 44 is formed through a first injection molding step. The elongated member 50 is then molded and coupled to the lens 44 in a second injection molding step. Integrally forming portions of the lens 44, while encapsulating the elongated member 50, and the photoluminescent structure 10, may protect the photoluminescent structure 10 from physical and chemical damage arising from environmental exposure. In alternative embodiments, additional components may be added during one of the injection steps, or successively added in additional injection steps to adhere more components of the illumination assembly 28. For example, the substrate 42, the elongated member 50, and the lens 44 may be a single integrally formed part in one embodiment.

Figure 6:
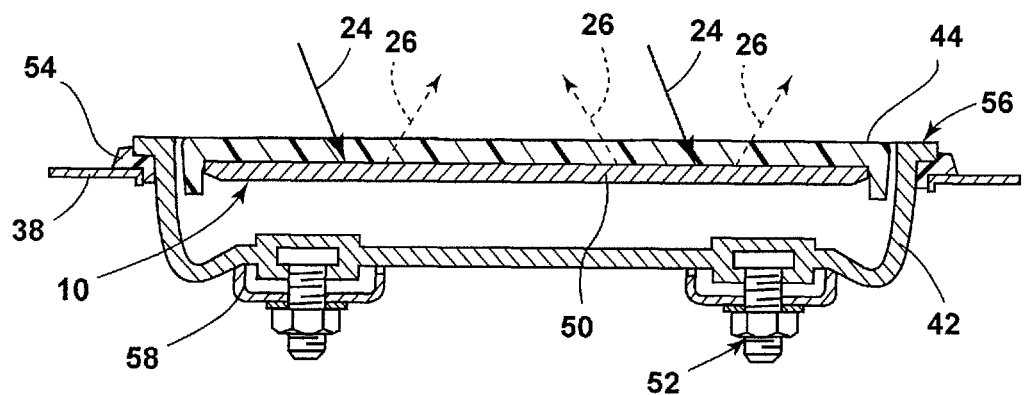
FIG. 6 is a cross-sectional view taken along the line V-V of FIG. 2 illustrating another embodiment of the illumination assembly having a photoluminescent structure disposed on an interior surface of the lens.

Referring to FIG. 6, a cross section of the illumination assembly 28 taken along the line V-V of FIG. 2 is shown having similar components to that of the illumination assembly 28 illustrated in FIG. 5. As illustrated, the photoluminescent structure 10 is disposed on the interior surface of the lens 44. Such methods may include preparing the photoluminescent structure 10 from a formulation in a liquid carrier medium and coating the lens 44 with the photoluminescent structure 10. The photoluminescent structure 10 may be applied to the lens 44 by painting, screen printing, spraying, slot coating, dip coating, roller coating, and bar coating. According to one embodiment, the photoluminescent structure 10 is disposed on the interior surface of the lens 44 to help prevent peeling, chipping, blistering and/or delamination.

To accomplish a desired coloring of outputted light, an oil based tintable liquid carrier containing the photoluminescent structure 10 therein may be utilized and can be tinted a desired color with a small addition of standard tints or through addition of a second photoluminescent material 18. According to one embodiment, a long persistent photoluminescent material 18 tint may be utilized for tinting the liquid carrier a desired color. Additionally, or alternatively, the liquid carrier medium may also contain reflective materials, such that the lens 44 is reflective when not illuminated, and the like. For example, the liquid carrier medium may become reflective with the addition of glass beads.

Figure 7:
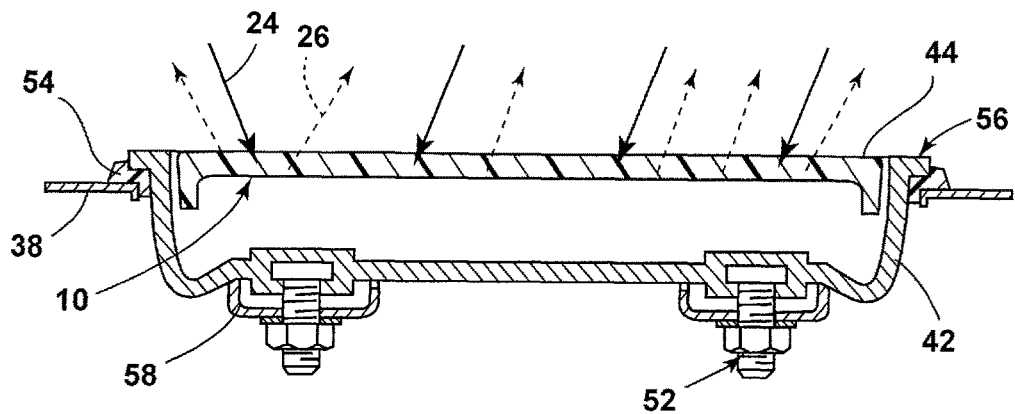
FIG. 7 is a cross-sectional view taken along the line V-V of FIG. 2 illustrating another embodiment of the illumination assembly having a photoluminescent structure integrally disposed with the lens.

Referring to FIG. 7, a cross section of the illumination assembly 28 taken along the line V-V of FIG. 2 is shown having similar components to that of the illumination assembly 28 illustrated in FIG. 5. However, the photoluminescent structure 10 illustrated in FIG. 7 may be integrated within the lens 44 such that additional components or materials rearwardly of the lens 44 may not be necessary. For example, the photoluminescent structure 10 may be rendered by dispersing the photoluminescent material 18 into a solid state solution (homogenous mixture in a dry state) that may be incorporated in a polymer matrix, which may form the lens 44 through any process known in the art, including, but not limited to, extrusion, injection molding, compression molding, calendaring, thermoforming, etc.

The lens 44 may be molded in color so that no secondary painting operation is required. In one embodiment, a heated resin and a colorant may be injected into a mold. The resin may have material properties comparable with a polycarbonate-acrylonitrile butadiene styrene (PC/ABS) and may have translucent and/or transparent characteristics. The resin may also contain a reflective molded-in-color characteristic. The reflective molded-in-color resin may achieve a low gloss, quality, reflective appearance once injection, compression, or vacuum molded, without secondary paint operations. The resulting illuminating assembly will deliver a reflective appearance when the photoluminescent structure 10 does not emit converted light 26 and emit light when the photoluminescent structure 10 receives the excitation light 24. The illumination color may be a combination of the converted light 26 and/or the color of the lens 44.

According to one embodiment, a long persistent photoluminescent material 18 is integrated into the lens 44 and the substrate 42 is integrally attached to the rear surface of the lens 44. Such a configuration may create a very thin illumination assembly 28 that is still capable of meeting all reflective and illuminated requirements of a vehicle side marker 40. The illumination assembly 28 may include an adhesive on the rear surface of the substrate 42 such that the marker may be placed at any location on the body of the vehicle 32 without any additional componentry.

Figure 8:
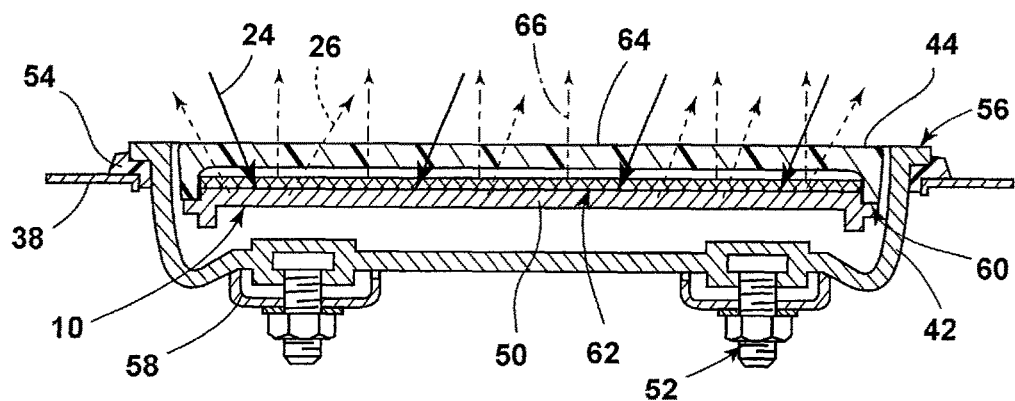
FIG. 8 is a cross-sectional view taken along the line V-V of FIG. 2 illustrating another embodiment of the illumination assembly having a first photoluminescent structure and a second photoluminescent structure disposed between the lens and the substrate.

Referring to FIG. 8, a cross section of the illumination assembly 28 taken along the line V-V of FIG. 2 is shown having similar components to that of the illumination assembly 28 illustrated in FIG. 5, according to an alternate embodiment, in which more than one photoluminescent structure 10 is disposed within the illumination assembly 28. The first photoluminescent structure 10 may include a long persistent photoluminescent material 18, as described herein, that emits the first converted light 26 at a second wavelength.

A second photoluminescent structure 62 may contain a second photoluminescent material and be disposed between the first photoluminescent structure 10 and an exterior surface of the lens 44. The second photoluminescent structure 62 may be configured to shift the color of the first converted light 26 emitted from the first photoluminescent structure 10 to modify or tune the first converted light 26 emitted from the first photoluminescent structure 10 into a second photoluminescent structure 66 of a third wavelength. In alternate embodiments, the second photoluminescent structure 62 may emit the second photoluminescent structure 66 in response to any other excitation source. As discussed above, the first and/or second photoluminescent structures 10, 62 may be disposed within the lens 44 to minimize the thickness of the illumination assembly 28.

Figure 9:
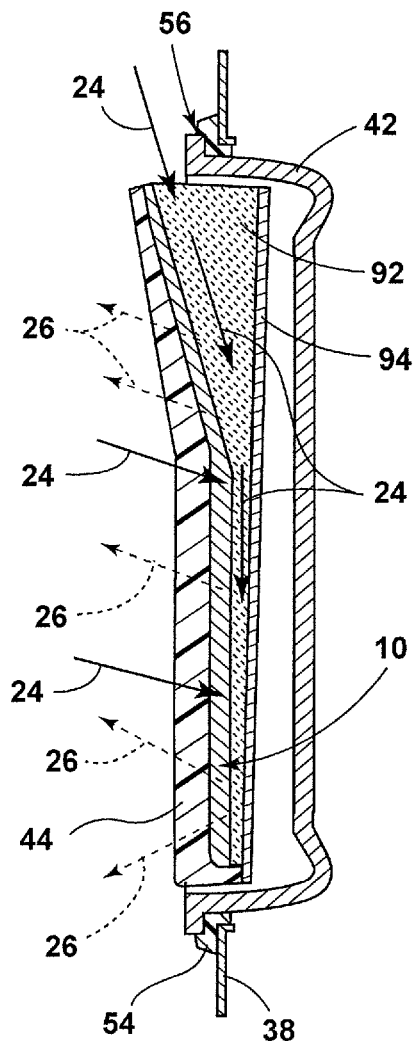
FIG. 9 is a cross-sectional view taken along the line V-V of FIG. 2 illustrated another embodiment of the illumination assembly having optics disposed rearwardly of the photoluminescent structure.

Referring to FIG. 9, a cross section of the illumination assembly 28 taken along the line IX-IX of FIG. 2 is shown, according to one embodiment, in which the illumination assembly 28 includes an optical grade light guide 92 disposed substantially rearwardly of the lens 44 and photoluminescent structure 10. The light guide 92 may be configured to direct light downwardly along the photoluminescent structure 10 such that substantially even amounts of excitation light 24 are distributed to most of the photoluminescent structure 10. In response, converted light 26 may be emitted through the lens 44 in a substantially uniform manner in both a vertical and a horizontal direction along the lens 44.

The light guide 92 may be a substantially transparent or translucent guide suitable for transmitting light (e.g., excitation light). The light guide 92 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 92.

Further, the light guide 92 may be a flexible light guide, wherein a suitable flexible material is used to create the light guide 92. Such flexible materials include urethanes, silicone, thermoplastic polyurethane (TPU), or other like optical grade flexible materials. Whether the light guide 92 is flexible or rigid, the light guide 92, when formed, is substantially optically transparent and/or translucent and capable of transmitting light. The light guide 92 may be referred to as a light pipe, a light plate, a light bar or any other light carrying or transmitting substrate made from a clear or substantially translucent material. Known methods of attaching the light guide 92 to the lens 44 include bonding of a preformed light guide 92 within the illumination assembly 28 by adhesion, such as by using a double-sided tape, or by mechanical connections, such as brackets.

Alternatively, the lens 44, photoluminescent structure 10, and light guide 92 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 92, which may be integrally formed with the lens 44. Additional optics may also be molded into the light guide 92 during the multi-material injection molding process. Initially, the lens 44 may be formed through a first injection molding step, or through successive steps, if necessary. Next, the photoluminescent structure 10 may be disposed within the lens 44, or later applied to a surface of the lens 44. The light guide 92 is then molded and coupled to the lens 44 in a subsequent injection molding step.

Still referring to FIG. 9, a reflective material 94 may be disposed on portions of the light guide 92 such that excitation light 24 directed through the light guide 92 may substantially exit a desired portion of the light guide 92. The reflective material 92 may be an additional layer of material, such as paint, that is adhered to the desired portions of the light guide 92. Accordingly, a substantial portion of excitation light 24 that is directed through the light guide 92 may be converted by the photoluminescent structure 10 to converted light 26 that exits the illumination assembly 28 through the lens 44 in an evenly distributed manner.

Figure 10:
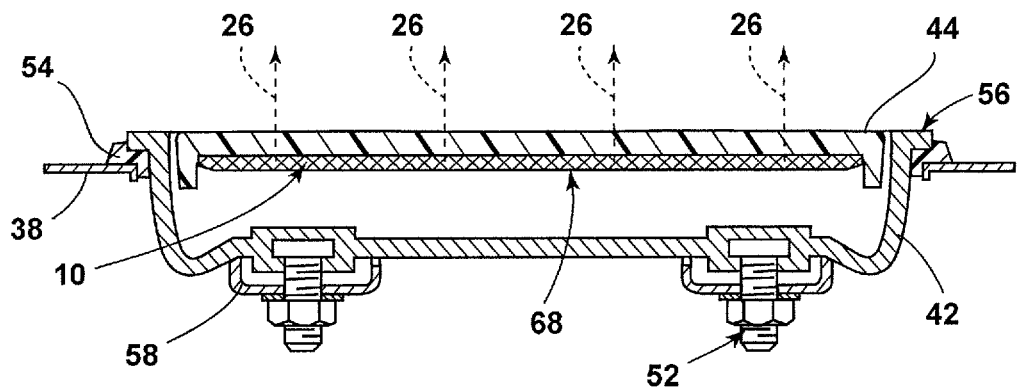
FIG. 10 is a cross-sectional view taken along the line V-V of FIG. 2 illustrating another embodiment of the illumination assembly having a light source disposed between the lens and the substrate.

Referring to FIG. 10, a cross section of the illumination assembly 28 taken along the line V-V of FIG. 2 is shown, according to an alternate embodiment, in which the illumination assembly 28 may include and/or be integrally formed with a light source 68 that is capable of illuminating a portion of the lens 44 and is disposed below the first and second photoluminescent structures 10, 62. Accordingly, the light source 68 may emit the excitation light 24 for the first and/or second photoluminescent structures 10, 62 when the light source 68 is illuminated. Moreover, the excitation light 24 emitted from the light source 68 and the photoluminescent structure 10 may combine to form additional colors that may be emitted through the lens 44. According to one embodiment, the photoluminescent structure 10 may emit red light whenever excitation light 24 is received from the light source 68.

Figure 11A:
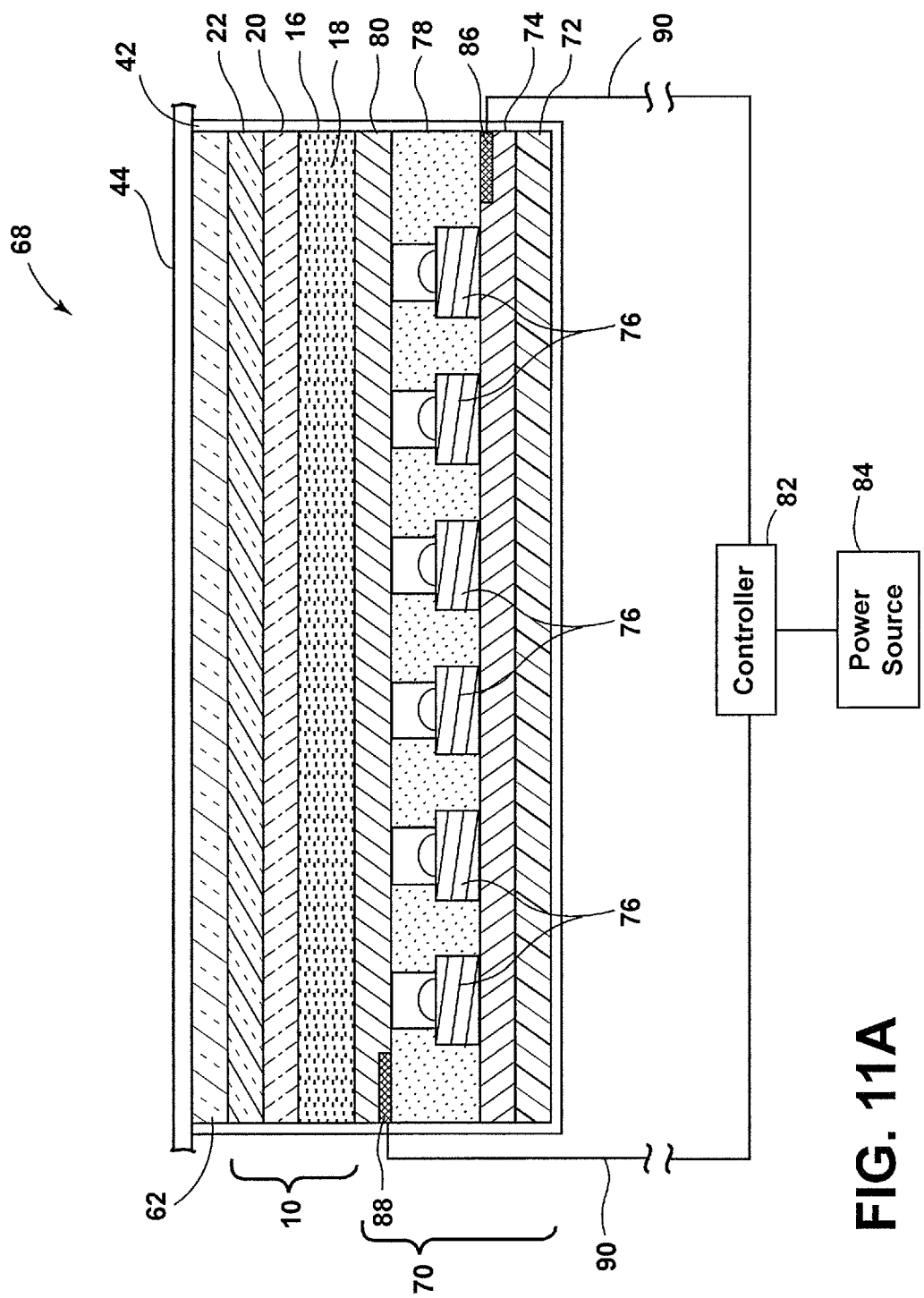
FIG. 11A is a cross-sectional view taken along line X-X of FIG. 10 illustrating a light source according to one embodiment.

Referring to FIG. 11A, a cross-sectional view of the source and lens 44 is shown according to one embodiment. It is to be understood that any illumination assembly 28 on the vehicle 32 may be assembled in a similar fashion. As illustrated in FIG. 11A, the light source 68 may have a stacked arrangement that includes a light-producing assembly 70, first and second photoluminescent structures 10, 62 and the lens 44.

The light-producing assembly 70 may correspond to a thin-film or printed light emitting diode (LED) assembly and includes a substrate 72 as its lowermost layer. The substrate 72 may include a polycarbonate, poly-methyl methacrylate (PMMA), polyester, polypropylene, or polyethylene terephthalate (PET) material on the order of 0.005 to 0.060 inches thick. Alternatively, as a cost saving measure, the substrate 72 may directly correspond to a preexisting vehicle structure (i.e., the substrate 42).

The light-producing assembly 70 also includes a positive electrode 74 arranged over the substrate 72. The positive electrode 74 includes a conductive epoxy such as, but not limited to, a silver-containing or copper-containing epoxy. The positive electrode 74 is electrically connected to at least a portion of a plurality of LED sources 76 arranged within a semiconductor ink 78 and applied over the positive electrode 74. Likewise, a negative electrode 80 is also electrically connected to at least a portion of the LED sources 76. The negative electrode 80 is arranged over the semiconductor ink 78 and includes a transparent or translucent conductive material such as, but not limited to, indium tin oxide. Additionally, each of the positive and negative electrodes 74, 80 are electrically connected to a controller 82 and a power source 84 via a corresponding bus bar 86, 88 and conductive leads 90. The bus bars 86, 88 may be printed along opposite edges of the positive and negative electrodes 74, 80 and the points of connection between the bus bars 86, 88 and the conductive leads 90 may be at opposite corners of each bus bar 86, 88 to promote uniform current distribution along the bus bars 86, 88.

The LED sources 76 may be dispersed in a random or controlled fashion within the semiconductor ink 78 and may be configured to emit focused or non-focused light toward the photoluminescent structure 10. The LED sources 76 may correspond to micro-LEDs of gallium nitride elements on the order of 5 to 400 microns in size and the semiconductor ink 78 may include various binders and dielectric material including, but not limited to, one or more of gallium, indium, silicon carbide, phosphorous, and/or translucent polymeric binders. In this manner, the semiconductor ink 78 may contain various concentrations of LED sources 76 such that the density of the LED sources 76 may be adjusted for various lighting applications.

The semiconductor ink 78 can be applied through various printing processes, including ink jet and silk screen processes to selected portion(s) of the positive electrode 74. Thus, it is envisioned that the LED sources 76 are dispersed within the semiconductor ink 78, and shaped and sized such that a substantial quantity of the LED sources align with the positive and negative electrodes 74, 80 during deposition of the semiconductor ink 78. The portion of the LED sources 76 that ultimately are electrically connected to the positive and negative electrodes 74, 80 may be illuminated by a combination of the bus bars 86, 88, controller 82, power source 84, and conductive leads 90. According to one embodiment, the power source 84 may correspond to a vehicular power source operating at 12 to 16 VDC. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 11A, the first and second photoluminescent structures 10, 62 are arranged over the negative electrode 80 as a coating, layer, film or other suitable deposition. With respect to the presently illustrated embodiment, the first photoluminescent structure 10 may be arranged as a multi-layered structure including the energy conversion layer 16, optional stability layer 20, and optional protective layer 22, as described above. The second photoluminescent structure 62 may also be arranged as a multi-layered structure including an energy conversion layer 92, optional stability layer 94, and optional protective layer 96, as described above. The first photoluminescent structure 10 and/or second photoluminescent structure 62 may contain a long persistent photoluminescent material 18.

The lens 44 is disposed over the second photoluminescent structure 62 and should be at least partially light transmissible. In this manner, the lens 44 will be illuminated by the first and/or second photoluminescent structure 10, 62 or the light-producing assembly 70. Additionally, by disposing the lens 44 over the first and second photoluminescent structures 10, 62, it may also function to protect the first and second photoluminescent structures 10, 62 and the light-producing assembly 70. The lens 44 may be arranged in a planar shape and/or an arcuate shape to enhance its viewing potential.

Figure 11B:
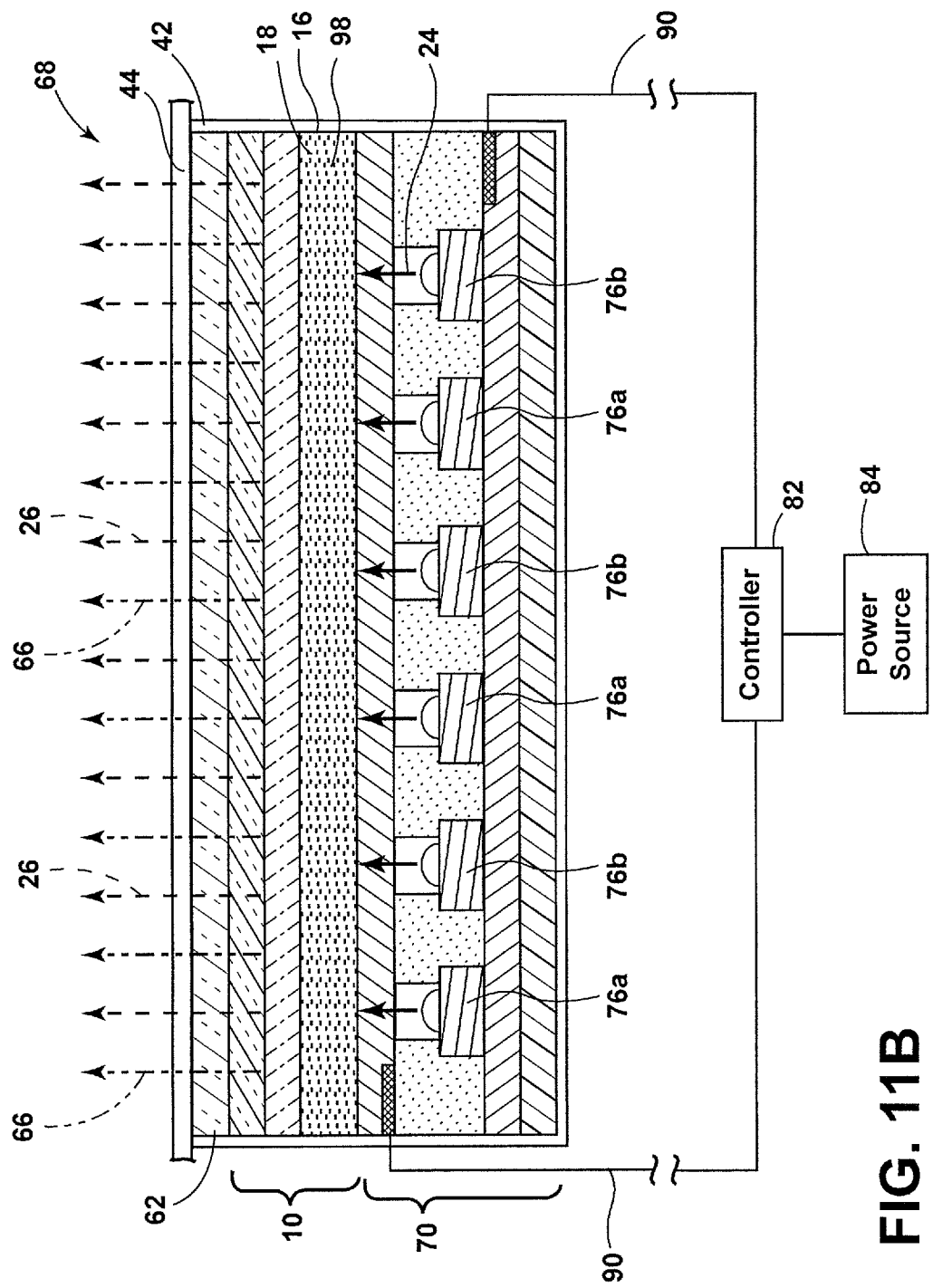
FIG. 11B is a cross-sectional view taken along line IX-IX of FIG. 8 further illustrating the light source, according to one embodiment.

Referring to FIG. 11B, an energy conversion process for generating multiple colors of light is illustrated according to one embodiment. For consistency, the energy conversion process is also described below using the illumination assembly 28 depicted in FIG. 11A. In this embodiment, the energy conversion layer 16 includes two different photoluminescent materials 18, 98. Alternatively, the photoluminescent materials 18, 98 may be isolated from each other if desired. Also, it should be appreciated that the energy conversion layer 16 may include more than two different photoluminescent materials, in which case, the teachings provided below similarly apply. In one embodiment, the energy conversion process occurs by way of down conversion using blue, violet, and/or UV light as the source of excitation.

With respect to the presently illustrated embodiment, the excitation of photoluminescent materials 18 and 98 are mutually exclusive. That is, photoluminescent materials 18 and 98 are formulated to have non-overlapping absorption spectrums and Stoke shifts that yield different emission spectrums. Also, in formulating the photoluminescent materials 18, 98, care should be taken in choosing the associated Stoke shifts such that the converted light 26 emitted from one of the photoluminescent materials 18, 98 does not excite the other, unless so desired.

According to one exemplary embodiment, a first portion of the LED sources 76, exemplarily shown as LED sources 76a, is configured to emit an excitation light 24 having an emission wavelength that only excites photoluminescent material 18 and results in the excitation light 24 being converted into a visible light of a first color. Likewise, a second portion of the LED sources 76, exemplarily shown as LED sources 76b, is configured to emit an excitation light 24 having an emission wavelength that only excites photoluminescent material 98 and results in the excitation light 24 being converted into a visible light of a second color.

Preferably, the first and second colors are visually distinguishable from one another. In this manner, LED sources 76a and 76b may be selectively activated using the controller 82 to cause the photoluminescent structure 10 to luminesce in a variety of colors. For example, the controller 82 may activate only LED sources 76a to exclusively excite photoluminescent material 18, resulting in the lens 44 illuminating in the first color. Alternatively, the controller 82 may activate only LED sources 76b to exclusively excite photoluminescent material 98, resulting in the lens 44 illuminating in the second color. Alternatively still, the controller 82 may activate LED sources 76a and 76b in concert, which causes both of the photoluminescent materials 18, 98 to become excited, resulting in the lens 44 illuminating in a third color, which is a color mixture of the first and second color. For energy conversion layers 16 containing more than two distinct photoluminescent materials, a greater diversity of colors may be achieved. Contemplated colors include red, green, blue, and combinations thereof including white, all of which may be achieved by selecting the appropriate photoluminescent materials and correctly manipulating their corresponding LED sources.

Accordingly, an illumination assembly for a vehicle has been advantageously described herein. The assembly may provide various benefits including a simple and cost-effective means to produce a variety of illumination features that may be used as a styling feature and/or to provide active and/or passive exterior lighting to the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle side marker, comprising:
   a substrate having an edge attached to a lens, the substrate defining a cavity;
   a first photoluminescent structure on an elongated member that is operably coupled with the lens proximate the cavity and configured to luminesce in response to receiving an excitation light emitted by a light source; and
   a light guide having a varied thickness with a first end disposed in the cavity between the substrate and the lens and a second end extending outwardly of the edge, forming a gap between the substrate and the lens to accept the excitation light therethrough.

2. The vehicle side marker of claim 1, further comprising:
   a second photoluminescent structure disposed the elongated member, wherein the first and second photoluminescent structures each comprise at least one photoluminescent material configured to down convert an excitation light received from at least a portion of the light sources into a visible light.

3. The vehicle side marker of claim 1, wherein the first photoluminescent structure includes a long persistent photoluminescent material therein.

4. The vehicle side marker of claim 1, wherein the first photoluminescent structure is part of a medium that includes reflective characteristics such that the lens is reflective when the photoluminescent structure is not illuminated and emits converted light of a desired color when the photoluminescent structure receives the excitation light.

5. The vehicle side marker of claim 1, wherein the excitation light comprises one of blue light, violet light, and UV light.

6. The vehicle side marker of claim 1, wherein the substrate is disposed within a vehicle body panel.

7. The vehicle side marker of claim 1, wherein the second photoluminescent structure is disposed between the first photoluminescent structure and the exterior surface of the lens, and wherein a converted light emitted from the first photoluminescent structure is an excitation light for the second photoluminescent structure.

8. A vehicle illumination assembly, comprising:
   a substrate having a rim and a body;
   a lens having a first side coupled to a first edge of the rim and extending substantially parallel to the body of the substrate forming a gap between the substrate and the lens;
   a light guide having a varied thickness disposed in the gap formed between the lens and the substrate and extending outward of the rim on a second edge; and
   a photoluminescent structure disposed between the lens and substrate and configured to luminesce in response to excitation light.

9. The vehicle illumination assembly of claim 8, wherein the photoluminescent structure includes a long persistent photoluminescent material therein.

10. The vehicle illumination assembly of claim 9, wherein the photoluminescent structure is contained within a carrier medium, the carrier medium further having reflective characteristics such that the lens has a reflective appearance when the photoluminescent structure is not illuminated and emits converted light of a desired color when the photoluminescent structure receives the excitation light.

11. The vehicle illumination assembly of claim 8, wherein the photoluminescent structure comprises at least one photoluminescent material configured to down convert an excitation light received from at least a portion of the light source into a visible light that is outputted to a viewable portion.

12. The vehicle illumination assembly of claim 8, wherein the illumination assembly is configured as a side marker for a vehicle.

13. The vehicle illumination assembly of claim 8, wherein the photoluminescent structure is disposed along a first side of the light guide and a reflective material is disposed along a second, opposed side of the light guide.

14. The vehicle illumination assembly of claim 8, wherein the excitation light enters the light guide through a side portion thereof, the side portion unimpeded by the lens.

* * * * *